(12) United States Patent
Damnjanovic et al.

(10) Patent No.: US 11,197,166 B2
(45) Date of Patent: Dec. 7, 2021

(54) SYNCHRONOUS COMMUNICATIONS MODE DETECTION FOR UNLICENSED SPECTRUM

(71) Applicant: QUALCOMM Incorporated, San Diego, CA (US)

(72) Inventors: Aleksandar Damnjanovic, Del Mar, CA (US); Andrei Dragos Radulescu, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 16/871,867

(22) Filed: May 11, 2020

(65) Prior Publication Data

US 2020/0374702 A1 Nov. 26, 2020

Related U.S. Application Data

(60) Provisional application No. 62/852,579, filed on May 24, 2019.

(51) Int. Cl.
*H04W 72/04* (2009.01)
*H04W 16/14* (2009.01)
(Continued)

(52) U.S. Cl.
CPC ....... *H04W 16/14* (2013.01); *H04W 56/0015* (2013.01); *H04W 72/0446* (2013.01);
(Continued)

(58) Field of Classification Search
CPC combination set(s) only.
See application file for complete search history.

(56) References Cited

U.S. PATENT DOCUMENTS

2015/0023315 A1\* 1/2015 Yerramalli .......... H04W 74/002
370/330
2015/0341749 A1\* 11/2015 Jodlauk ............. H04W 72/0446
455/414.2
(Continued)

FOREIGN PATENT DOCUMENTS

EP 1107483 A1 6/2001

OTHER PUBLICATIONS

International Search Report and Written Opinion—PCT/US2020/032455—ISA/EPO—dated Sep. 15, 2020.

*Primary Examiner* — Lan-Huong Truong
(74) *Attorney, Agent, or Firm* — Liem T. Do

(57) ABSTRACT

Synchronous communications mode detection is disclosed for unlicensed spectrum communications. To detect synchronous mode communications, an observing node monitors on-off transitions of communication transmissions on a shared communication spectrum. The observing node detects the on-off transition spacing of the on-off transitions over a sliding window of a detection period duration. The node may determine the number of candidate synchronous on-off transition spacings of the detected on-off transition spacings that are equal to an integer multiple of a synchronization period. If the number of candidate synchronous on-off transition spacings exceeds a threshold value the observing node will declare detection of a synchronous operation mode of the shared communication spectrum.

28 Claims, 9 Drawing Sheets

(51) Int. Cl.
  *H04W 56/00* (2009.01)
  *H04W 74/08* (2009.01)
  *H04W 84/18* (2009.01)
(52) U.S. Cl.
  CPC ... *H04W 72/0453* (2013.01); *H04W 74/0816* (2013.01); *H04W 84/18* (2013.01)

(56) References Cited

U.S. PATENT DOCUMENTS

| | | | |
|---|---|---|---|
| 2016/0128084 A1* | 5/2016 | Novlan | H04W 72/1268 370/329 |
| 2018/0124749 A1 | 5/2018 | Park et al. | |
| 2018/0316454 A1 | 11/2018 | Damnjanovic et al. | |

* cited by examiner

SYNCHRONOUS COMMUNICATIONS MODE DETECTION FOR UNLICENSED SPECTRUM

CROSS-REFERENCE TO RELATED APPLICATIONS

This application claims the benefit of U.S. Provisional Patent Application No. 62/852,579, entitled, "SYNCHRONOUS COMMUNICATIONS MODE DETECTION FOR UNLICENSED SPECTRUM," filed on May 24, 2019, which is expressly incorporated by reference herein in its entirety.

BACKGROUND

Field

Aspects of the present disclosure relate generally to wireless communication systems, and more particularly, to synchronous communications mode detection for unlicensed spectrum communications.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes monitoring, by a wireless node, on-off transitions of communication transmissions on a shared communication spectrum, detecting, by the wireless node, on-off transition spacing of the on-off transmissions over a sliding window of a detection period duration, determining, by the wireless node, a number of candidate synchronous on-off transition spacings of the detected on-off transition spacing equal to an integer multiple of a synchronization period, and declaring, by the wireless node, detection of a synchronous operation mode of the shared communication spectrum in response to the number of candidate synchronous on-off transition spacings exceeding a threshold value.

In an additional aspect of the disclosure, an apparatus configured for wireless communication includes means for monitoring, by a wireless node, on-off transitions of communication transmissions on a shared communication spectrum, means for detecting, by the wireless node, on-off transition spacing of the on-off transmissions over a sliding window of a detection period duration, means for determining, by the wireless node, a number of candidate synchronous on-off transition spacings of the detected on-off transition spacing equal to an integer multiple of a synchronization period, and means for declaring, by the wireless node, detection of a synchronous operation mode of the shared communication spectrum in response to the number of candidate synchronous on-off transition spacings exceeding a threshold value.

In an additional aspect of the disclosure, a non-transitory computer-readable medium having program code recorded thereon. The program code further includes code to monitor, by a wireless node, on-off transitions of communication transmissions on a shared communication spectrum, code to detect, by the wireless node, on-off transition spacing of the on-off transmissions over a sliding window of a detection period duration, code to determine, by the wireless node, a number of candidate synchronous on-off transition spacings of the detected on-off transition spacing equal to an integer multiple of a synchronization period, and code to declare, by the wireless node, detection of a synchronous operation mode of the shared communication spectrum in response to the number of candidate synchronous on-off transition spacings exceeding a threshold value.

In an additional aspect of the disclosure, an apparatus configured for wireless communication is disclosed. The apparatus includes at least one processor, and a memory coupled to the processor. The processor is configured to monitor, by a wireless node, on-off transitions of communication transmissions on a shared communication spectrum, to detect, by the wireless node, on-off transition spacing of the on-off transmissions over a sliding window of a detection period duration, to determine, by the wireless node, a number of candidate synchronous on-off transition spacings of the detected on-off transition spacing equal to an integer multiple of a synchronization period, and to declare, by the wireless node, detection of a synchronous operation mode of the shared communication spectrum in response to the number of candidate synchronous on-off transition spacings exceeding a threshold value.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
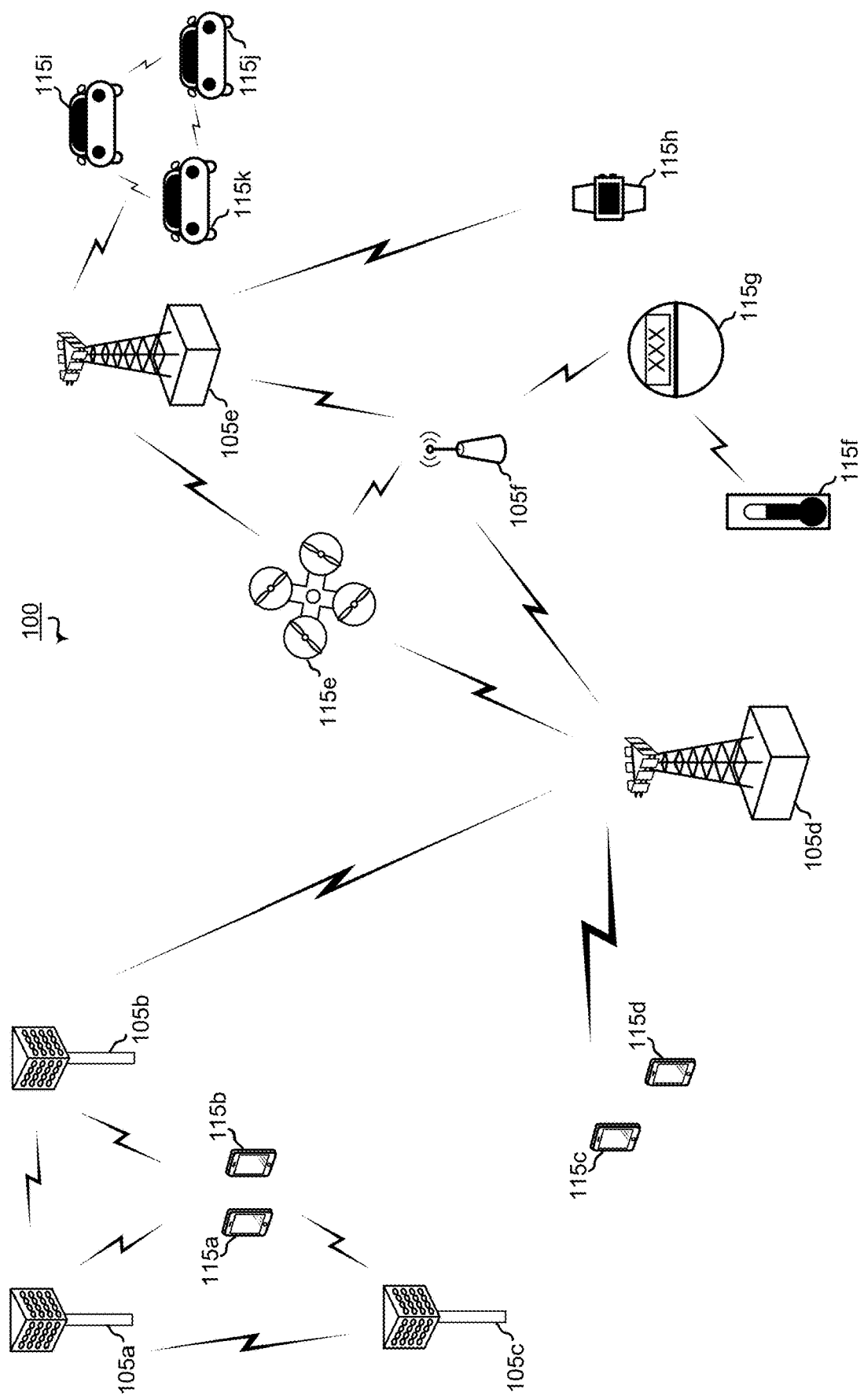
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
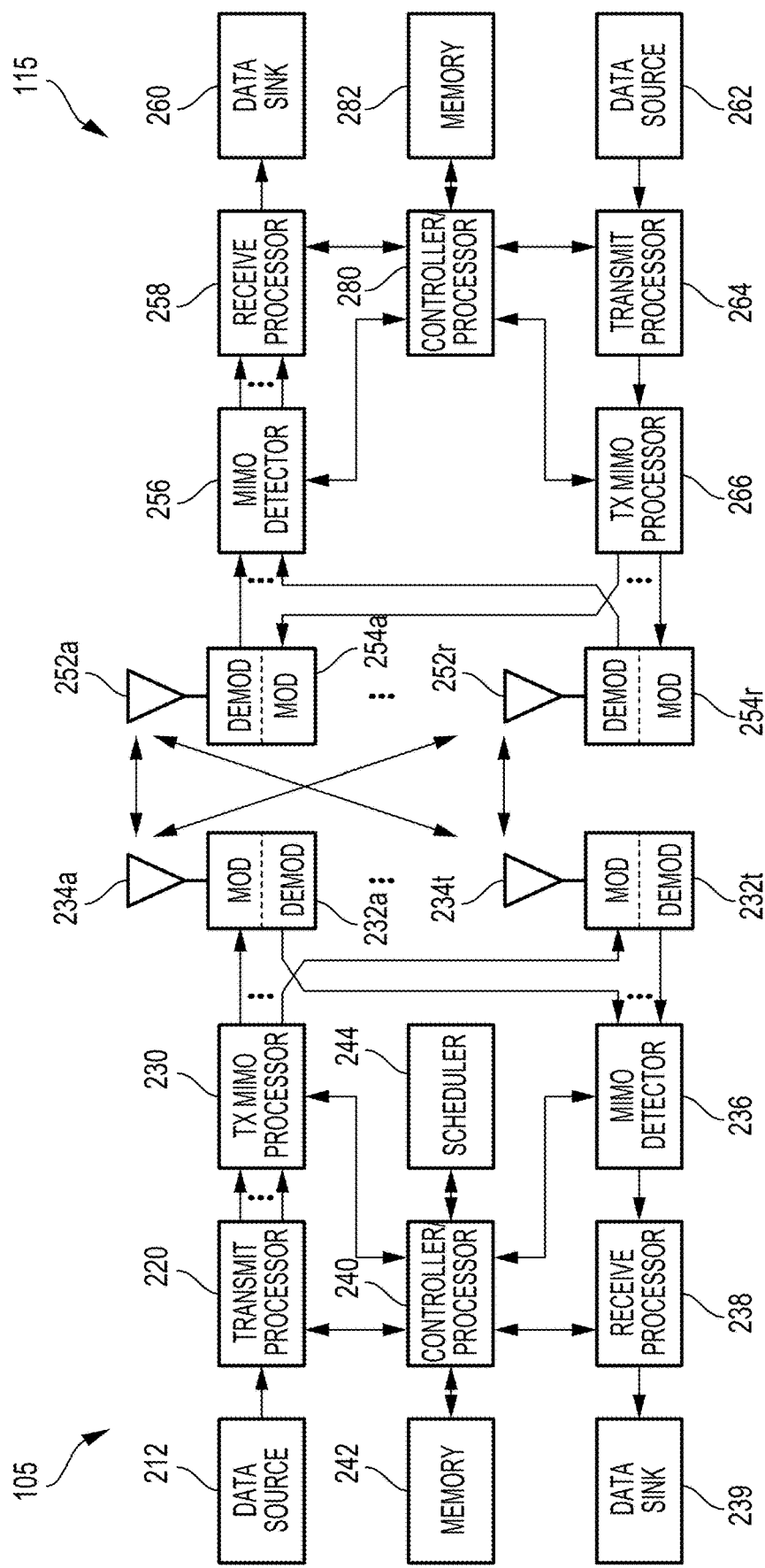
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
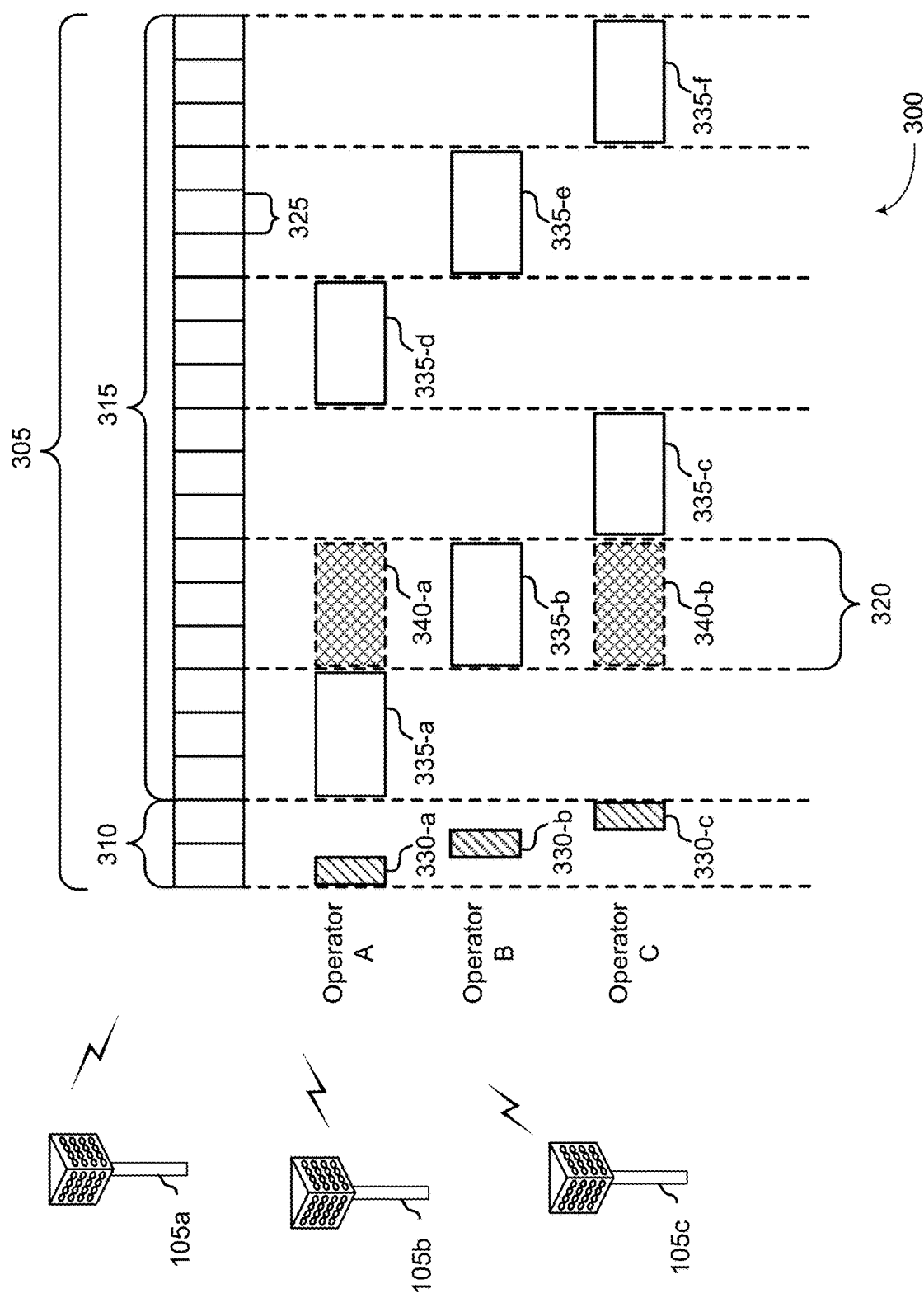
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c may be prioritized for Operator C (e.g., G-INT-OpC), resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of the superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

With current medium access rules, the existing listen before talk (LBT) schemes may suffer from starvation (e.g., failure to secure channel access) due to interference experienced from exposed or hidden nodes. The medium access procedure is further not well defined for CoMP operations. Trigger-based schemes used for uplink multi-user multiple input, multiple output (MU-MIMO) operations may not be considered "fair" due to the potentially higher transmit power of the access points compared to its clients. Additionally, there is no current or practical technology neutral way to protect the receiver. When defined in WiFi operations, receiver protection techniques have not perform well in heavily loaded scenarios when WiFi preambles are not detected due to low signal-to-interference plus noise ratio (SINR).

Synchronous access schemes have been suggested to improve handling of such issues. Synchronization can improve fairness since it enables overlapping contention window. It mitigates exposed node interference issues. Each node can get fair share of the medium. In addition, it can help mitigate hidden node interference problems since at a given time, all nodes monitor control signaling. Moreover, receiver protection, analogous to clear-to-send (CTS) message is possible to achieve in a technology neutral way.

Figure 4:
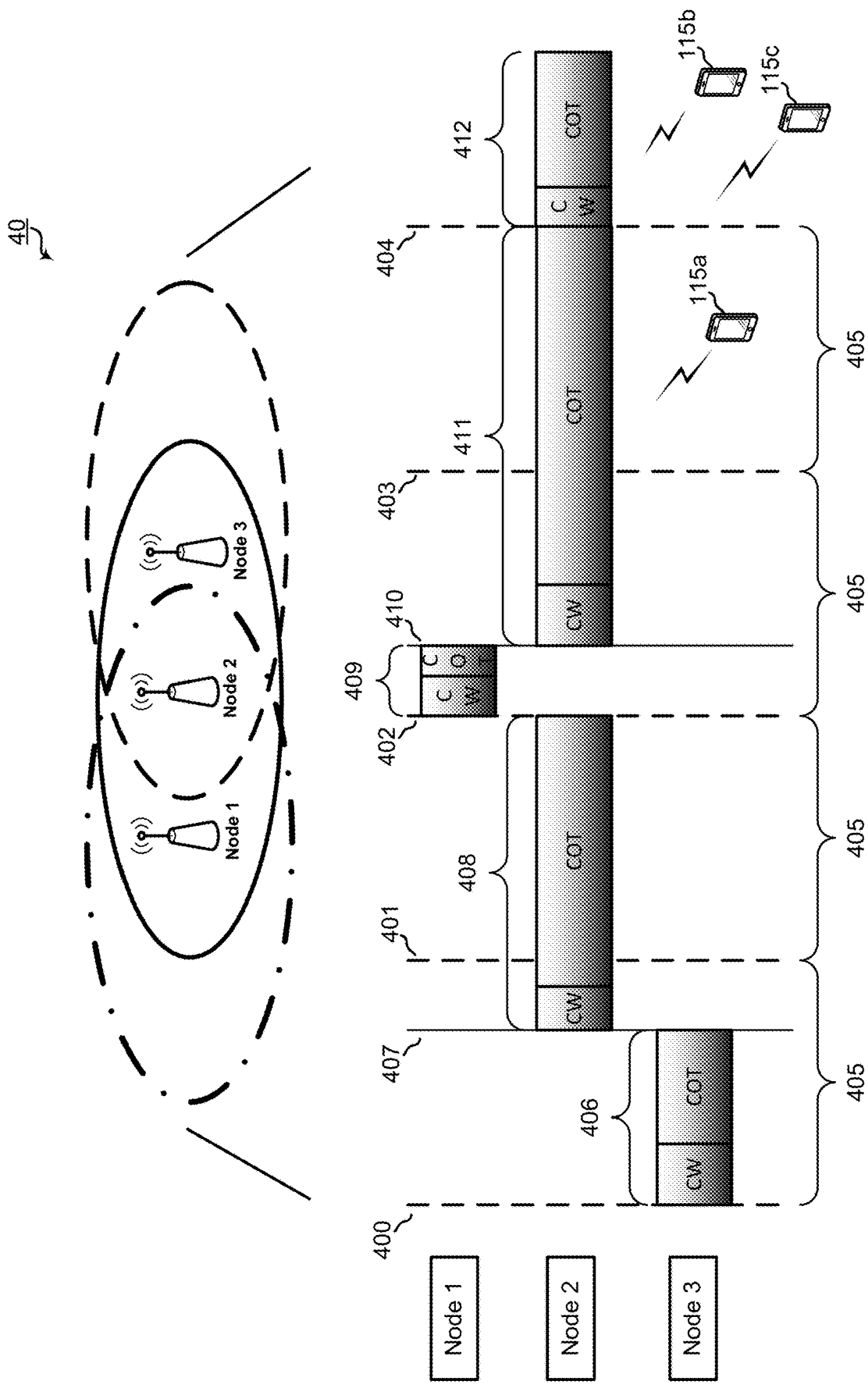
FIG. 4 is a block diagram illustrating a portion of an NR-U network having nodes 1-3 which are capable of synchronous mode operations in the portion of the NR-U network.

FIG. 4 is a block diagram illustrating a portion of an NR-U network 40 having nodes 1-3 which are capable of synchronous mode operations in the portion of NR-U network 40. As illustrated, three wireless nodes, nodes 1-3, have been situated such that the coverage areas of each node substantially overlaps with the coverage area of the other nodes. Nodes 1 and 3 may have portions of their coverage area that are not overlapped by the other nodes, respectively. However, the coverage area of node 2 is completely overlapped by either the coverage area of node 1 or node 3. FIG. 4 further shows the illustrative timelines for each of nodes 1-3. In providing communications with UEs 115a-c, the medium access procedure for each node includes contention windows in which each node may contend for the shared communication channel.

Periodic synchronization boundaries may be defined by standards (e.g., FCC standards, etc.).

Such nodes would have predefined configuration information for synchronization boundaries including the periodicity (e.g., 6 ms, 8 ms, etc.) defined relative to the Global Navigation Satellite System (GNSS) time. According to the illustrated example, a communication burst may be defined as the total transmission time of the master device and any associated slave devices including the gaps to switch transmission direction and the continuous idle time of the contention window sensed by the master device immediately prior to the beginning of the transmission. When not operating under synchronized transmission, each communications burst may not span more than one synchronization boundary. When a given node has sufficient data to be transmitted, a communication burst associated with such node may not be shorter than the synchronization boundary period unless the communication burst ends at the synchronization boundary, and if the communication burst begins at a synchronization boundary, the burst will end at the next synchronization boundary as long as there remains data in the buffer, in order to preserve and maintain synchronized traffic. However, when a node elects to perform transmission according to the synchronized transmission configuration, the synchronized node may maintain a communication burst beyond the synchronization boundary.

As illustrated in FIG. 4, node 2 has sufficient data to transmit according to the synchronized transmission configuration while nodes 1 and 3 are either not capable of synchronized transmission or do not have sufficient data for prolonged transmissions. Node 2, operating according to the synchronized transmission configuration, identifies synchronization boundaries 400-404 occurring at a periodicity 405. At synchronization boundary 400, node 3 has data and wins access to the shared communication channel with the contention window of communication burst 406. Without enough data to continue transmitting to synchronization boundary 401, node 3 ends communication burst 406 at 407. Node 2, operating according to the synchronizing configuration. obtains access to the share communication channel in the contention window of communication burst 408. Because node 2 is operating synchronously, it knows the locations of synchronization boundaries 400-404, upon securing access to the shared communication channel at 407, node 2 is allowed to exceed the single synchronization periodicity transmission limit and continue transmissions to the next synchronization boundary, synchronization boundary 402, after a next full synchronization period. According to the illustrated example, node 2, when operating synchronously, may continue transmissions for up to two synchronization periods.

After node 2 stops transmissions at synchronization boundary 402, node 1 successfully obtains access to the share communication channel for a short transmission, communication burst 409, ending at 410. Again, with sufficient data for transmission, node 2 regains access to the shared communication channel at 410 for communication burst 411 which extends for the majority of the duration of synchronization period 405 between synchronization boundaries 402 and 403, and the full synchronization period 405 between synchronization boundaries 403 and 404. By rule, node 2 stops transmission at synchronization boundary 404, but, with still more data for transmission, contends for and obtains access to the shared communication channel for communication burst 412. According to the illustrated aspect, synchronized transmissions are not mandated by the standards, but enabled and motivated through the ability of participating nodes to extend transmissions for longer than the standard limit of a single synchronization periodicity 405.

In A CoMP scenario, adjacent transmission-reception points (TRP) can block each other's channel access and significantly reduce any gains that would normally be achievable through CoMP operations. Synchronization of access contention allows overlapping of the contention windows among TRPs and across operators, which can help realize the CoMP operation gains in a multi-operator scenario. When medium access is successful, the system behavior can be closer to the licensed spectrum networks than typical unlicensed, which results ultimately in better performance. Otherwise, CoMP operations based on independent TRP contention would rely on triggers and would result in creating localized clusters that may be suboptimal. However, issues may arise where both synchronous and asynchronous transmission modes are available in shared communication spectrum. For devices capable of synchronous operation, it may not be beneficial to attempt synchronous mode operation when other network nodes in the area are not sync mode capable. Accordingly, it may be beneficial for a network node to be able to detect synchronous mode operations in a given region. Various aspects of the present disclosure provide a technology-neutral test for wireless nodes to detect whether synchronous mode operations are occurring in an accessible location.

As illustrated in FIG. 4, devices conforming to the synchronous communication mode may be allowed to extend a channel occupancy time (COT) beyond its nominal value so that the transmissions end at the synchronization boundary, defined either globally or locally. If, for example, the synchronization period is 5 ms, detecting a significant fraction of channel occupancy end times at the periodic interval equal to the synchronization period (5 ms) or integer multiple thereof, an observing node may determine the presence of synchronous mode operations.

Figure 5:
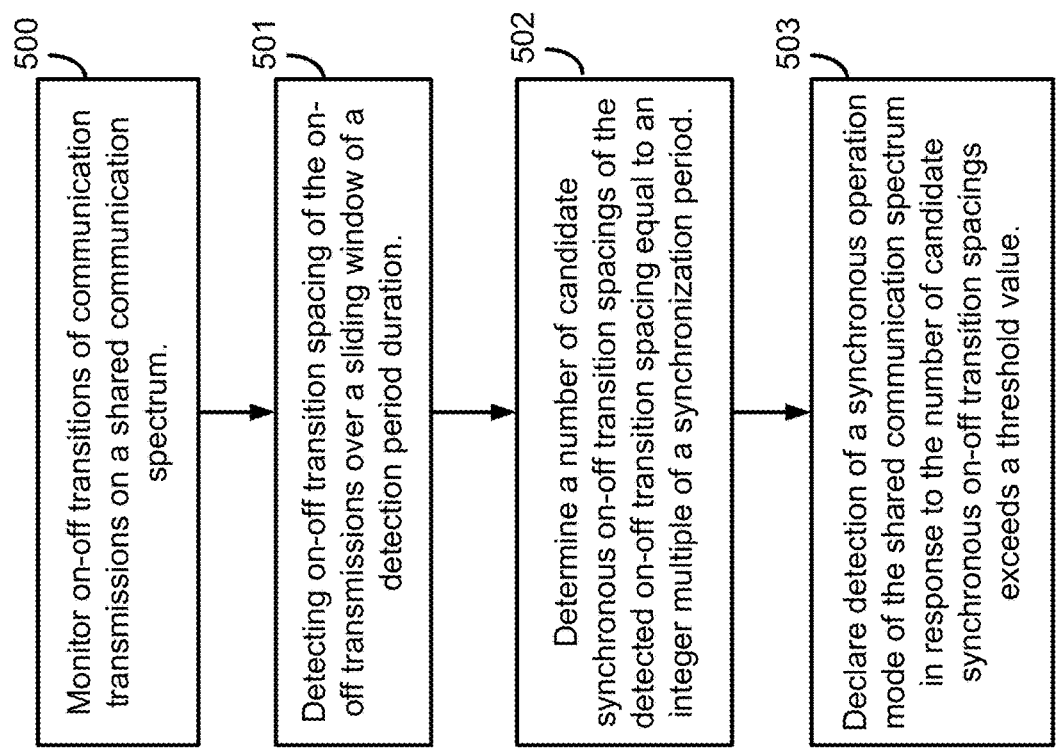
FIG. 5 is a block diagram illustrating example blocks executed to implement one aspect of the present disclosure.
Figure 8:
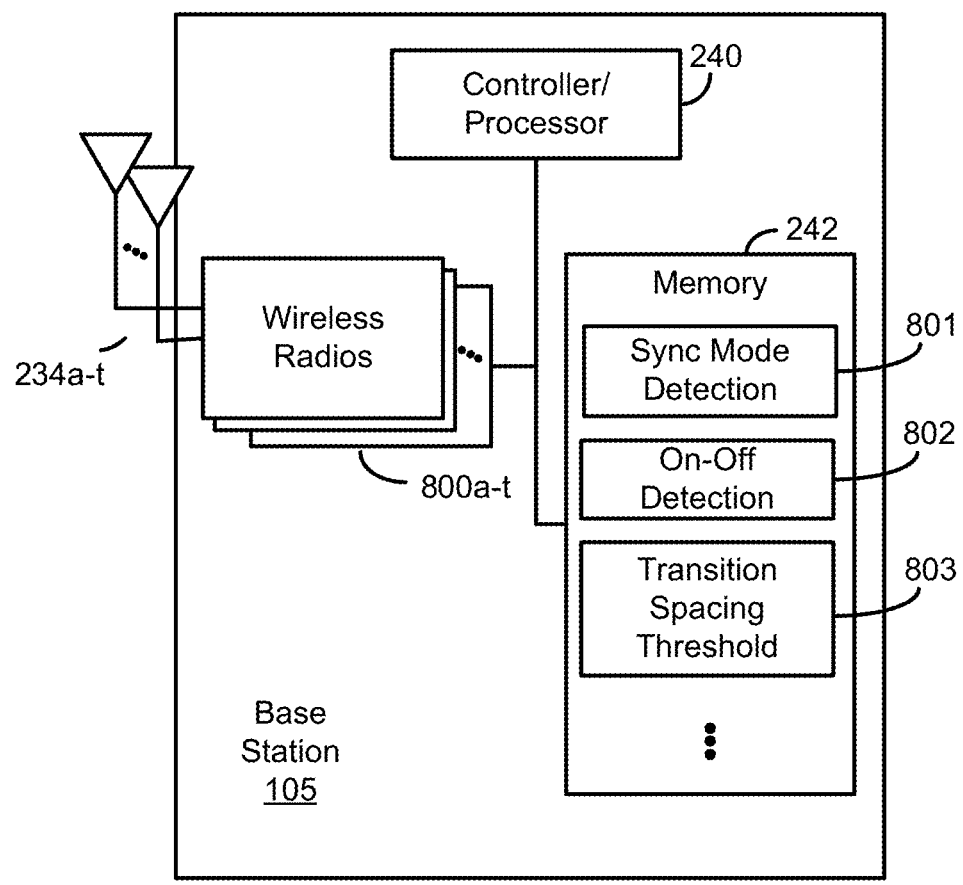
FIG. 8 is a block diagram illustrating a base station configured according to one aspect of the present disclosure.

FIG. 5 is a block diagram illustrating example blocks executed to implement one aspect of the present disclosure. The example blocks will also be described with respect to base station 105 as illustrated in FIG. 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 800a-t and antennas 234a-t. Wireless radios 800a-t includes various components and hardware, as illustrated in FIG. 2 for base station 105, including modulator/demodulators 232a-t, MIMO detector 236, receive processor 238, transmit processor 220, and TX MIMO processor 230.

Figure 9:
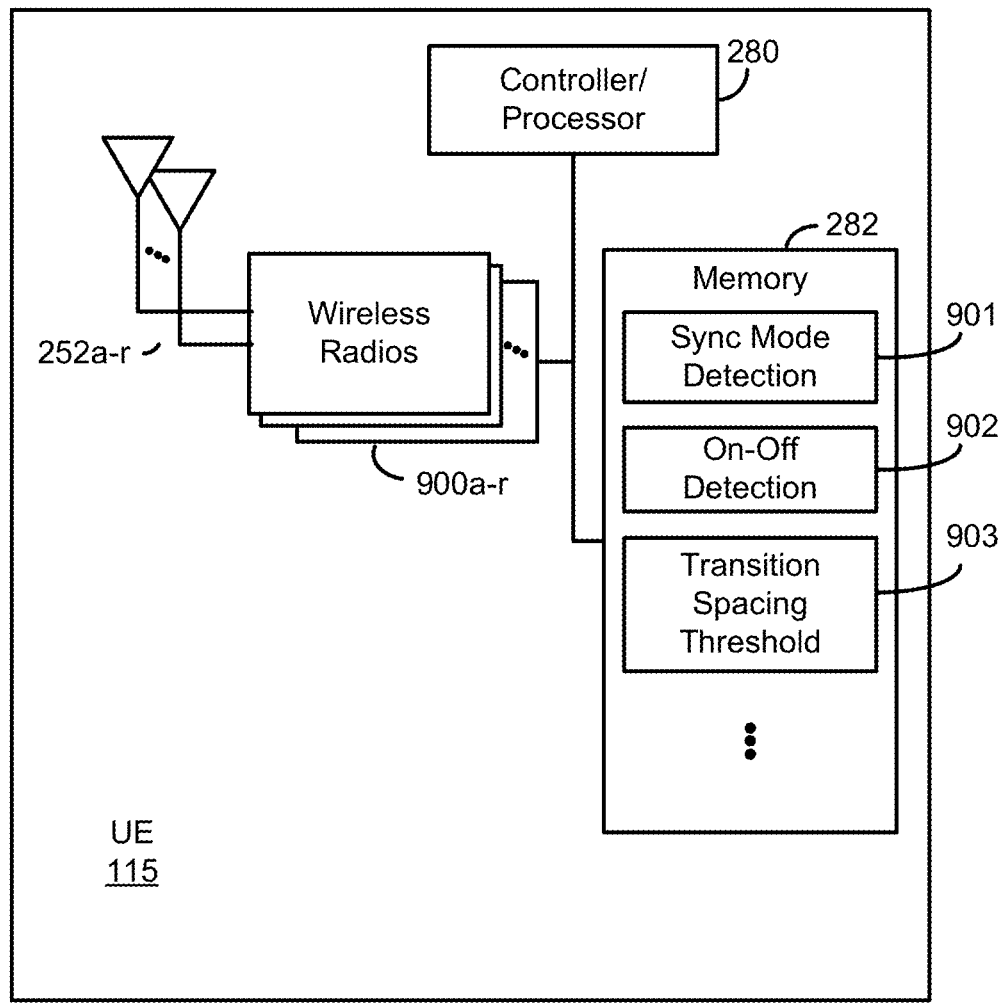
FIG. 9 is a block diagram illustrating a UE configured according to one aspect of the present disclosure.

The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At block 500, a wireless node monitors on-off transitions of communication transmissions on a shared communication spectrum. The wireless node may be implemented either as a base station, such as base station 105, or a UE, such as UE 115, each with synchronous mode capability and in an unknown region of a shared communication spectrum. It is unknown whether at least some other nodes participating in communications within the region over the same shared communication spectrum are conducting communications using synchronous mode communications. Such other nodes may be nodes performing communications using the same or different radio access technologies to the wireless node.

To detect whether synchronous mode operations are being conducted over the shared communication spectrum, the wireless node initiates detection logic for detecting such synchronous mode operations. When implemented as a base station, such as base station 105, base station 105, under control of controller/processor 240, executes synchronous mode detection logic 801. Similarly, when implemented as a UE, such as UE 115, UE 115, under control of controller/processor 240, executes synchronous mode detection logic 901. The execution environments of synchronous mode detection logic 801 and 901 provide the functionality to base station 105 and UE 115, respectively, to detect synchronous mode operations.

According to the functionality of the execution environment of synchronous mode detection logic 801 and 901, the wireless node (base station 105 or UE 115), under control of controller/processor 240 (base station 105) or 280 (UE 115), further executes on-off detection logic 802 (base station 105) or 902 (UE 115), stored in memory 242 (base station 105) or 282 (UE 115). Within the execution environment of on-off detection logic 802 or 903, the wireless node (base station 105 or UE 115) monitors communications on the shared communication spectrum via antennas 234a-t and wireless radios 800a-t (base station 105) or antennas 252a-r and wireless radios 900a-r (UE 115) to determine when current transmissions, which last for at least a first channel occupancy time (COT) length, end and give way to no signals occupying the shared spectrum (an idle period). In order for the wireless mode (base station 105 or UE 115) to characterize a transition between detection of signals occupying the shared spectrum and detection of no signals occupying the spectrum as an on-off transition, the idle period should be at least a minimum idle length. Otherwise, the wireless node (base station 105 or UE 115) would consider that the transmitting node has not relinquished the spectrum.

At block 501, the wireless node detects on-off transition spacing of the on-off transmissions over a sliding window of a detection period duration. Within the execution environment of synchronous mode detection logic 801 and 901, the wireless node (base station 105 or UE 115) identifies each detected on-off transitions within a sliding window covering a duration of the detection period. The wireless node (base station 105 or UE 115) may then determine the spacing between each such detected on-off transition.

At block 502, the wireless node determines a number of candidate synchronous on-off transition spacings of the detected on-off transition spacing equal to an integer multiple of a synchronization period. Further within the execution environment of synchronous mode detection logic 801 and 901, the wireless node (base station 105 or UE 115) determines which of the on-off transition spacings is equal to an integer multiple of the synchronization period.

At block 503, the wireless node declares detection of a synchronous operation mode of the shared communication spectrum in response to the number of candidate synchronous on-off transition spacings exceeds a threshold value. Further within the execution environment of synchronous mode detection logic 801 and 901, the wireless node (base station 105 or UE 115), under control of controller/processor 240 (base station 105) or 280 (UE 115) compare the number of such candidate synchronous on-off transition spacings to transition spacing threshold 803 (base station 105) or 903 (UE 115). When the threshold is exceeded, the wireless node (base station 105 or UE 115) may declare detection of a synchronous operation mode within the shared communication spectrum. Otherwise, when the threshold is not exceeded, the wireless node (base station 105 or UE 115) may declare no synchronous mode operations.

It should be noted that the number of candidate synchronous on-off transition spacings may be converted into a ratio or percentage of the number of candidate synchronous on-off transition spacings and either the total possible on-off transition spacings within the detection period or the total number of on-off transitions detected within the detection period. The transition spacing threshold 803 (base station 105) or 903 (UE 115) may be implemented as a ratio or percentage threshold to which to compare the ratio of the number of synchronous on-off transition spacings. If the ratio exceeds transition spacing threshold 803 (base station 105) or 903 (UE 115), the wireless node would consider synchronous mode operations to be present in the shared communication spectrum. Otherwise, the wireless node would consider no synchronous mode operations to be present.

Figure 6:
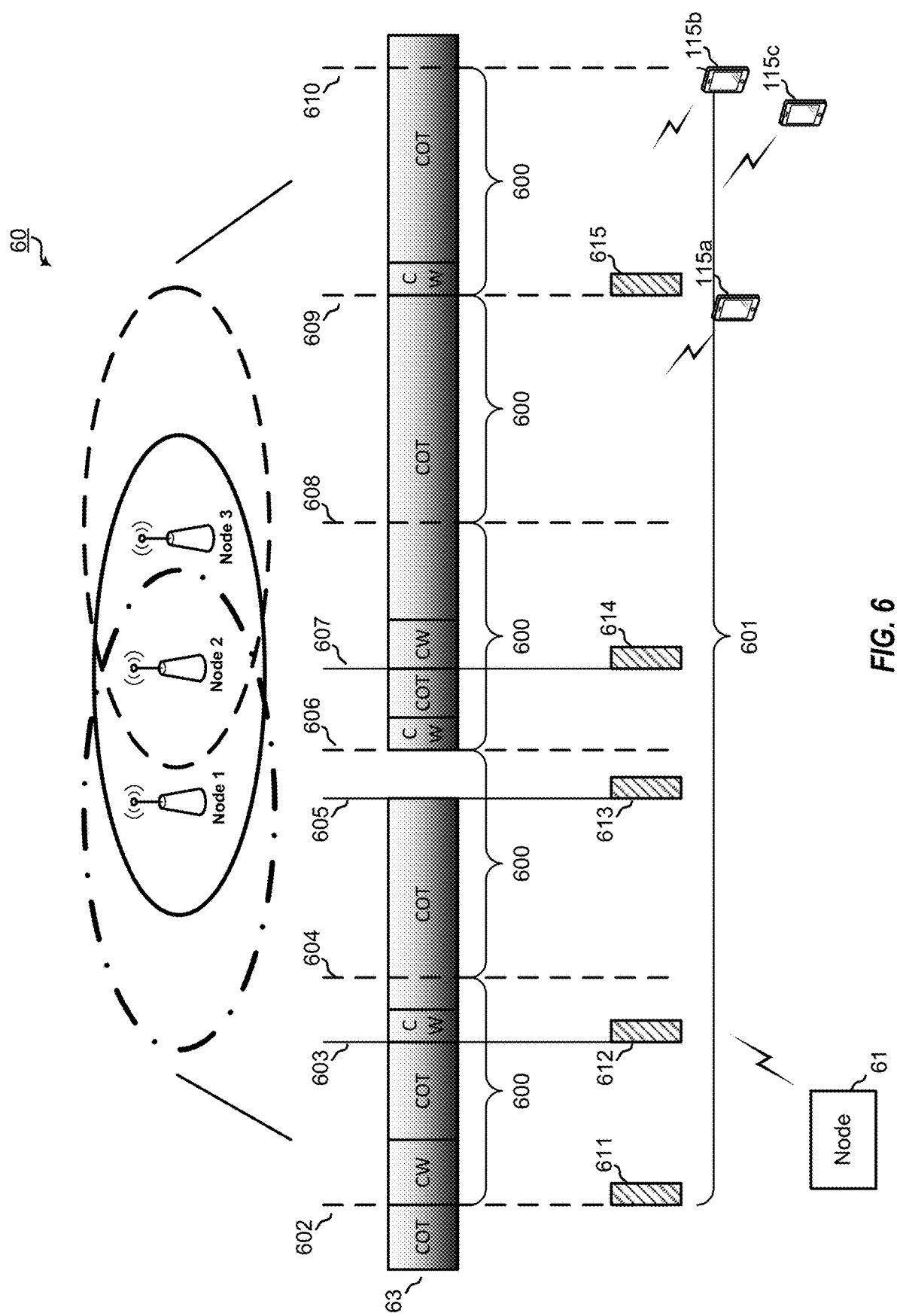
FIG. 6 is a block diagram illustrating a portion of an NR-U network having nodes 1-3 which are capable of synchronous mode operations in the portion of the NR-U network and a wireless node configured to test for synchronous mode operations according to one aspect of the present disclosure.

FIG. 6 is a block diagram illustrating a portion of an NR-U network 60 having nodes 1-3 which are capable of synchronous mode operations in the portion of NR-U network 60 and a wireless node 61 configured to test for synchronous mode operations according to one aspect of the present disclosure. As described with respect to FIG. 4, three wireless nodes, nodes 1-3, within NR-U network 60, have been situated such that the coverage areas of each node substantially overlaps with the coverage area of the other nodes. Nodes 1 and 3 may have portions of their coverage area that are not overlapped by the other nodes, respectively. However, the coverage area of node 2 is completely overlapped by either the coverage area of node 1 or node 3. FIG. 6 further shows the illustrative shared communication spectrum 63 for each of nodes 1-3. In providing communications with UEs 115*a-c*, the medium access procedure for each node includes contention windows in which each node may contend for the shared communication channel and COTs in which the winning node may conduct communication transmissions.

Wireless node 61 has access to shared communication spectrum 63 and is capable of synchronous mode operations. However, wireless node 61, as illustrated, does not know whether synchronous mode operations are occurring on shared communication spectrum 63. In accordance with one aspect of the present disclosure, wireless node 61 may perform a test for synchronous mode operations on shared communication spectrum 63.

The portion of NR-U network 60 includes synchronous boundaries 602, 604, 606, 608, 609, and 610 at synchronization periods 600. Nodes that are operating under the synchronous mode may end transmissions at a synchronous boundary over one or more synchronization periods 600. Over a detection period 601, wireless node 61 will monitor shared communication spectrum 63 for on-off transitions. An on-off transition occurs when transmissions detected in a COT end followed by an idle period with no transmissions detected on shared communication spectrum 63 for at least a minimum threshold idle period. Where an idle period less than the minimum threshold idle period is detected, then wireless node 61 will conclude that the node currently occupying shared communication spectrum 63 has not given up the medium yet. Wireless node 61 monitors for such on-off transitions across the entirety of detection period 601.

It should be noted that a COT, as detected or detectable by wireless node 61, may be defined either as continuous transmission over the identified COT period or bursty transmission over the identified COT period, where any idle periods between bursts are less than a threshold minimum idle period (e.g., 10 μs, 16 μs, 20 μs, etc.).

As transmissions occur on shared communication spectrum 63, wireless node 61 applies a sliding widow equal in duration to detection period 601 to detect on-off transitions and determine how many of such on-off transitions have an on-off transition spacing equal to an integer multiple of synchronization period 600. In operation of the sync mode test of the presently described aspect, wireless node 61 detects on-off transitions 611-615 at synchronous boundary 602, on-off boundaries 603, 605, 607, and synchronous boundary 609 within detection period 601. Wireless node 61 then observes the transition spacing between each of the detected on-off transitions 611-615 and determines if any such on-off transition spacings are equal to an integer multiple of synchronization period 600. As illustrated, wireless node 61 determines that one on-off transition spacing meets such criteria (e.g., the on-off transition spacing between on-off transition 614 and 615).

In order for wireless node 61 to determine and declare detection of synchronous mode operations on shared communication spectrum 63, wireless node 61 calculates whether the number of on-off transition spacings meets a threshold amount. In one example operation, wireless node 61 may determine a ratio or percentage of candidate on-off transition spacings (the ones that meet the criteria) to the total number of possible candidate on-off transition spacings available within detection period 601. As illustrated, there are six synchronous boundaries within detection period 601. Therefore, there are a total of five possible candidate on-off transition spacings available. The single detected candidate on-off transition spacing would account for 20% of the five possible candidate on-off transition spacings available. The threshold percentage may be predetermined and, for example, could be set to 20%, such that the detected on-off transition spacing identifies to wireless node 61 that synchronous mode operations are occurring within shared communication spectrum 63.

It should be noted that the 20% threshold percentage is only a single example implementation. The various implementation of the different aspects of the present disclosure may predefine other threshold percentages to indicate synchronous mode operations.

In another example implementation, wireless node 61 may determine a ratio or percentage of candidate on-off transition spacings to the total number of detected on-off transitions within detection period 601. In such an example implementation, wireless node 61 has detected five on-off transitions, which would result in four detected on-off transition spacings. The single detected candidate on-off transition spacing would account for 25% of the four possible candidate on-off transition spacings available. If, as in the prior example, the threshold percentage is also set to 20%, wireless node 61 may identify that synchronous mode operations are occurring within shared communication spectrum 63.

In each such example implementation of the described example aspect, wireless node 61 considers the candidate on-off transition spacings and not merely identifying on or off transitions that specifically occur at a synchronous boundary. As such, synchronous mode operations may be detected even though some transmissions do not end at a synchronous boundary.

It should further be noted that, in each such example implementation, additional aspects may provide for wireless node 61 to filter out certain COT lengths when detecting an on-off transition. Thus, in such additional aspect, the on-off transition identified at synchronous boundary 606 may not be identified as such because the COT period after synchronous boundary 606 does not meet the minimum threshold COT length. In such example aspects, the next on-off boundary after the on-off boundary identified at on-off boundary 605 would be at synchronous boundary 609.

Figure 7:
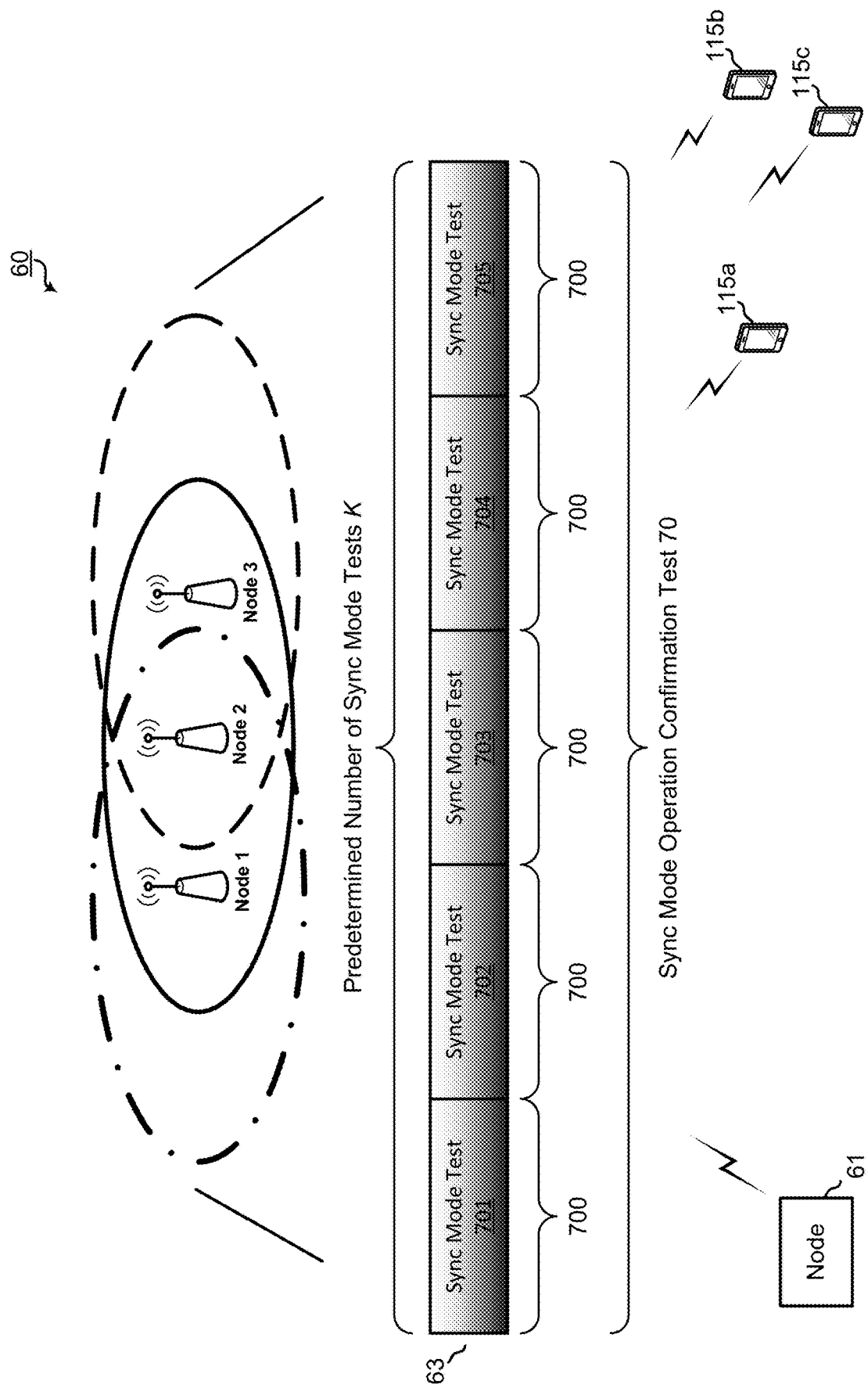
FIG. 7 is a block diagram illustrating a portion of an NR-U network having nodes 1-3 which are capable of synchronous mode operations in the portion of the NR-U network and a wireless node configured to test for synchronous mode operations according to one aspect of the present disclosure.

FIG. 7 is a block diagram illustrating a portion of an NR-U network 60 having nodes 1-3 which are capable of synchronous mode operations in the portion of NR-U network 60 and a wireless node 61 configured to test for synchronous mode operations according to one aspect of the present disclosure. FIG. 7 illustrates a longer portion of communications within NR-U network 60 over shared communication spectrum 63. As an overall confirmation of any detection of synchronous mode operations by the synchronous mode test illustrated and described with respect to FIG. 6, such a synchronous mode test may be performed multiple time by wireless node 61. The number of times, K, to perform the synchronous mode test may be predetermined. Thus, wireless node 61 may perform synchronous mode tests 701-705 each at a duration of detection period 700. Within each of synchronous mode tests 701-705, wireless node 61 monitors for on-off transitions, determines a number of on-off transition spacings meet the criteria of being an integer multiple of the synchronization period, and then declares detection of a synchronous mode operation when the number of on-off transition spacings meets a minimum threshold, as described in greater detail above with respect to FIG. 6.

Once wireless node 61 completes K synchronous mode tests, it may perform synchronous mode operation confirmation test 70. Synchronous mode operation confirmation test 70 determines whether the number of detected synchronous mode results of synchronous mode tests 701-705 meets a minimum threshold. The minimum threshold may be preset to a value that would reasonably support a conclusion that synchronous mode operations are, in fact, detected on shared communication spectrum 63. For example, such a minimum threshold may be 60%, 70%, 80%, etc. of the K synchronous mode test results. If the minimum threshold number of results from synchronous mode tests 701-705 indicate detection of synchronous mode operations on shared communication spectrum 63, wireless node 61 will maintain the declaration of the synchronous operation mode. Otherwise, if the results of synchronous mode tests 701-705 fail to meet the minimum threshold, wireless node 61 will identify no synchronous mode operations on shared communication spectrum 63.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   monitoring, by a wireless node, on-off transitions of communication transmissions on a shared communication spectrum;
   detecting, by the wireless node, on-off transition spacing of the on-off transmissions over a sliding window of a detection period duration;
   determining, by the wireless node, a number of candidate synchronous on-off transition spacings of the detected on-off transition spacing equal to an integer multiple of a synchronization period; and
   declaring, by the wireless node, detection of a synchronous operation mode of the shared communication spectrum in response to the number of candidate synchronous on-off transition spacings exceeding a threshold value.

2. The method of claim 1, wherein the monitoring the on-off transitions includes:
   monitoring for a transition between an ending of communication transmissions of a channel occupancy time (COT) and an idle period greater than a minimum idle threshold.

3. The method of claim 2, wherein the COT includes one of:
   continuous occupation of the shared communication spectrum by the communication transmissions for the duration of the COT; or
   occupation of the shared communication spectrum by the communication transmissions for the duration of the COT with one or more idle periods each less than the minimum idle threshold.

4. The method of claim 2, wherein a duration of the COT is at least a minimum COT duration threshold.

5. The method of claim 1, wherein the declaring the detection of the synchronous operation mode includes:
   calculating a synchronous candidate ratio using the number of candidate synchronous on-off transition spacings; and
   declaring the detection of the synchronous operation mode in response to the synchronous candidate ratio exceeding the threshold value of a minimum synchronous mode ratio.

6. The method of claim 5, wherein the calculating the synchronous candidate ratio includes one of:
   calculating the synchronous candidate ratio between the number of candidate synchronous on-off transition spacings and a total number of potential synchronous on-off transition spacings available over the detection period duration; or
   calculating the synchronous candidate ratio between the number of candidate synchronous on-off transition spacings and a total number of detected on-off transitions detected over the detection period duration.

7. The method of claim 1, further including:
   repeating the monitoring, the detecting, the determining, and the declaring a predetermined number of times;
   confirming a synchronous mode operation detection in response to the detection of the synchronous mode operation occurring in at least a threshold number of the predetermined number of times; and
   declaring, by the wireless node, an asynchronous mode operation in response to the detection of the synchronous mode operation occurring fewer than the threshold number of the predetermined number of times.

8. An apparatus configured for wireless communication, comprising:
   means for monitoring, by a wireless node, on-off transitions of communication transmissions on a shared communication spectrum;
   means for detecting, by the wireless node, on-off transition spacing of the on-off transmissions over a sliding window of a detection period duration;
   means for determining, by the wireless node, a number of candidate synchronous on-off transition spacings of the detected on-off transition spacing equal to an integer multiple of a synchronization period; and
   means for declaring, by the wireless node, detection of a synchronous operation mode of the shared communication spectrum in response to the number of candidate synchronous on-off transition spacings exceeding a threshold value.

9. The apparatus of claim 8, wherein the means for monitoring the on-off transitions includes:
   means for monitoring for a transition between an ending of communication transmissions of a channel occupancy time (COT) and an idle period greater than a minimum idle threshold.

10. The apparatus of claim 9, wherein the COT includes one of:

continuous occupation of the shared communication spectrum by the communication transmissions for the duration of the COT; or occupation of the shared communication spectrum by the communication transmissions for the duration of the COT with one or more idle periods each less than the minimum idle threshold.

11. The apparatus of claim 9, wherein a duration of the COT is at least a minimum COT duration threshold.

12. The apparatus of claim 8, wherein the means for declaring the detection of the synchronous operation mode includes:

means for calculating a synchronous candidate ratio using the number of candidate synchronous on-off transition spacings; and means for declaring the detection of the synchronous operation mode in response to the synchronous candidate ratio exceeding the threshold value of a minimum synchronous mode ratio.

13. The apparatus of claim 12, wherein the means for calculating the synchronous candidate ratio includes one of:

means for calculating the synchronous candidate ratio between the number of candidate synchronous on-off transition spacings and a total number of potential synchronous on-off transition spacings available over the detection period duration; or means for calculating the synchronous candidate ratio between the number of candidate synchronous on-off transition spacings and a total number of detected on-off transitions detected over the detection period duration.

14. The apparatus of claim 8, further including:

means for repeating the means for monitoring, the means for detecting, the means for determining, and the means for declaring a predetermined number of times;

means for confirming a synchronous mode operation detection in response to the detection of the synchronous mode operation occurring in at least a threshold number of the predetermined number of times; and means for declaring, by the wireless node, an asynchronous mode operation in response to the detection of the synchronous mode operation occurring fewer than the threshold number of the predetermined number of times.

15. A non-transitory computer-readable medium having program code recorded thereon, the program code comprising:

program code executable by a computer for causing the computer to monitor, by a wireless node, on-off transitions of communication transmissions on a shared communication spectrum;

program code executable by the computer for causing the computer to detect, by the wireless node, on-off transition spacing of the on-off transmissions over a sliding window of a detection period duration;

program code executable by the computer for causing the computer to determine, by the wireless node, a number of candidate synchronous on-off transition spacings of the detected on-off transition spacing equal to an integer multiple of a synchronization period; and program code executable by the computer for causing the computer to declare, by the wireless node, detection of a synchronous operation mode of the shared communication spectrum in response to the number of candidate synchronous on-off transition spacings exceeding a threshold value.

16. The non-transitory computer-readable medium of claim 15, wherein the program code executable by the computer for causing the computer to monitor the on-off transitions includes:

program code executable by the computer for causing the computer to monitor for a transition between an ending of communication transmissions of a channel occupancy time (COT) and an idle period greater than a minimum idle threshold.

17. The non-transitory computer-readable medium of claim 16, wherein the COT includes one of:

continuous occupation of the shared communication spectrum by the communication transmissions for the duration of the COT; or occupation of the shared communication spectrum by the communication transmissions for the duration of the COT with one or more idle periods each less than the minimum idle threshold.

18. The non-transitory computer-readable medium of claim 16, wherein a duration of the COT is at least a minimum COT duration threshold.

19. The non-transitory computer-readable medium of claim 15, wherein the program code executable by the computer for causing the computer to declare the detection of the synchronous operation mode includes:

program code executable by the computer for causing the computer to calculate a synchronous candidate ratio using the number of candidate synchronous on-off transition spacings; and program code executable by the computer for causing the computer to declare the detection of the synchronous operation mode in response to the synchronous candidate ratio exceeding the threshold value of a minimum synchronous mode ratio.

20. The non-transitory computer-readable medium of claim 19, wherein the program code executable by the computer for causing the computer to calculate the synchronous candidate ratio includes one of:

program code executable by the computer for causing the computer to calculate the synchronous candidate ratio between the number of candidate synchronous on-off transition spacings and a total number of potential synchronous on-off transition spacings available over the detection period duration; or program code executable by the computer for causing the computer to calculate the synchronous candidate ratio between the number of candidate synchronous on-off transition spacings and a total number of detected on-off transitions detected over the detection period duration.

21. The non-transitory computer-readable medium of claim 15, further including:

program code executable by the computer for causing the computer to repeat execution of the program code executable by the computer for causing the computer to monitor, to detect, to determine, and to declare a predetermined number of times;

program code executable by the computer for causing the computer to confirm a synchronous mode operation detection in response to the detection of the synchronous mode operation occurring in at least a threshold number of the predetermined number of times; and program code executable by the computer for causing the computer to declare, by the wireless node, an asynchronous mode operation in response to the detection of the synchronous mode operation occurring fewer than the threshold number of the predetermined number of times.

22. An apparatus configured for wireless communication, the apparatus comprising:
    at least one processor; and
    a memory coupled to the at least one processor,
    wherein the at least one processor is configured:
        to monitor, by a wireless node, on-off transitions of communication transmissions on a shared communication spectrum;
        to detect, by the wireless node, on-off transition spacing of the on-off transmissions over a sliding window of a detection period duration;
        to determine, by the wireless node, a number of candidate synchronous on-off transition spacings of the detected on-off transition spacing equal to an integer multiple of a synchronization period; and
        to declare, by the wireless node, detection of a synchronous operation mode of the shared communication spectrum in response to the number of candidate synchronous on-off transition spacings exceeding a threshold value.

23. The apparatus of claim 22, wherein the configuration of the at least one processor to monitor the on-off transitions includes configuration of the at least one processor to monitor for a transition between an ending of communication transmissions of a channel occupancy time (COT) and an idle period greater than a minimum idle threshold.

24. The apparatus of claim 23, wherein the COT includes one of:
    continuous occupation of the shared communication spectrum by the communication transmissions for the duration of the COT; or
    occupation of the shared communication spectrum by the communication transmissions for the duration of the COT with one or more idle periods each less than the minimum idle threshold.

25. The apparatus of claim 23, wherein a duration of the COT is at least a minimum COT duration threshold.

26. The apparatus of claim 22, wherein the configuration of the at least one processor to declare the detection of the synchronous operation mode includes configuration of the at least one processor:
    to calculate a synchronous candidate ratio using the number of candidate synchronous on-off transition spacings; and
    to declare the detection of the synchronous operation mode in response to the synchronous candidate ratio exceeding the threshold value of a minimum synchronous mode ratio.

27. The apparatus of claim 26, wherein the configuration of the at least one processor to calculate the synchronous candidate ratio includes configuration of the at least one processor to one of:
    calculate the synchronous candidate ratio between the number of candidate synchronous on-off transition spacings and a total number of potential synchronous on-off transition spacings available over the detection period duration; or
    calculate the synchronous candidate ratio between the number of candidate synchronous on-off transition spacings and a total number of detected on-off transitions detected over the detection period duration.

28. The apparatus of claim 22, further including configuration of the at least one processor:
    to repeat execution of the configuration of the at least one processor to monitor, to detect, to determine, and to declare a predetermined number of times;
    to confirm a synchronous mode operation detection in response to the detection of the synchronous mode operation occurring in at least a threshold number of the predetermined number of times; and
    to declare, by the wireless node, an asynchronous mode operation in response to the detection of the synchronous mode operation occurring fewer than the threshold number of the predetermined number of times.

* * * * *